US006982542B2

(12) United States Patent
Reah

(10) Patent No.: US 6,982,542 B2
(45) Date of Patent: Jan. 3, 2006

(54) ACCESSORY FOR USE WITH MOBILE TELEPHONES

(76) Inventor: Denis Graham Reah, 11 Mimosa Drive, Doonheights, Kingsburgh (ZA) 4126

( * ) Notice: Subject to any disclaimer, the term of this patent is extended or adjusted under 35 U.S.C. 154(b) by 142 days.

(21) Appl. No.: 10/481,316

(22) PCT Filed: Jun. 19, 2002

(86) PCT No.: PCT/IB02/02262

§ 371 (c)(1),
(2), (4) Date: Dec. 18, 2003

(87) PCT Pub. No.: WO03/001642

PCT Pub. Date: Jan. 3, 2003

(65) Prior Publication Data

US 2004/0165367 A1 Aug. 26, 2004

(30) Foreign Application Priority Data

Jun. 22, 2001 (ZA) ................................ 2001/5181

(51) Int. Cl.
*H01M 10/44* (2006.01)
*H01M 10/46* (2006.01)

(52) U.S. Cl. ........................................................ 320/114

(58) Field of Classification Search ................ 320/107, 320/110, 114, 115, 116; 429/9, 99, 100
See application file for complete search history.

(56) References Cited

U.S. PATENT DOCUMENTS 3,696,283 A * 10/1972 Ackley, III ................. 320/110
5,733,674 A * 3/1998 Law et al. .................. 320/125
5,963,014 A 10/1999 Chen

FOREIGN PATENT DOCUMENTS

GB 2 345 595 7/2000

* cited by examiner

*Primary Examiner*—Edward H. Tso
(74) *Attorney, Agent, or Firm*—Hodgson Russ LLP

(57) ABSTRACT

The invention relates to an accessory for use with mobile telephones. The accessory comprises a support body defining compartments within which mobile telephones and mobile telephone chargers can be held. The compartments for holding telephone chargers are each associated with a socket arrangement that can receive the contact pins of a telephone charger, all the socket arrangements being electrically connected with one another and being connectable to an electricity power supply. The accessory permits a plurality of mobile telephones to be simultaneously held therein and to be charged via their chargers from a single electricity power supply.

16 Claims, 3 Drawing Sheets

ACCESSORY FOR USE WITH MOBILE TELEPHONES

This invention relates to an accessory for use with mobile telephones.

According to the invention there is provided an accessory for use with mobile telephones, which comprises a support body that defines at least two pairs of holding formations, each pair of holding formations including a first formation in which a mobile telephone can be held and a second formation in which the charger of a mobile telephone can be held, and in which the support body has an electrical connector arrangement located thereon that includes a socket arrangement, for receiving the pins of a mobile telephone charger, for the second formation of each pair of holding formations and connector means for connecting the socket arrangements to a mains electricity power supply.

The support body may comprise a box-like structure defined by a base wall, two side walls, a front wall and a rear wall and the pairs of holding formations may be compartments defined within the box-like structure. Particularly, the pairs of holding formations may be disposed adjacent one another between the side walls of the box-like structure, with each first formation being a compartment disposed adjacent the front wall of the structure and each second formation being a compartment disposed operatively behind the first formation with which it forms a pair.

According to one particular embodiment of the invention, the second formations of the pairs of holding formations comprise a common compartment in which the socket arrangements are positioned to each receive the pins of a mobile telephone charger therein in a configuration in which all the socket arrangements can have the pins of a mobile telephone charger received therein while located in the common compartment, operatively behind a first formation in which an associated mobile telephone can be held. The accessory may include a lid for the said common compartment.

Further according to the invention, the compartments defining the pairs of holding formations each may be separated by a partition wall that has a slot formation defined therein for receiving an electric cord of a mobile telephone charger, to permit a mobile telephone held in a first compartment to be electrically connected with its charger via a cord leading from the charger.

The front wall of the box-like structure forming the accessory of the invention preferably is of a transparent sheet material.

Still further according to the invention, the support body may define formations for supporting the body against a support wall. Also, the support body may have at least one hook-like formation projecting therefrom in a configuration in which at least one key can be suspended from the support body.

Each socket arrangement may be adapted to cooperate with the connector pins of a predetermined mobile telephone charger. Alternatively, each socket arrangement may be adapted to cooperate with the connector pins of a predetermined range of mobile telephone chargers.

The connector means of the electrical connector arrangement may include a connector body mounted on the support body, which is electrically connected to the socket arrangements and which is accessible to permit a connector at one end of an electrical cord to cooperate therewith for connecting the socket arrangements in line with a mains electricity power supply, to which the other end of the cord is connectable via a connector plug. The connector arrangement also may include an on-off switch for controlling current flow to the socket arrangements.

The support body of the accessory of the invention may define complementary inter-connecting formations on the respective opposite sides thereof for permitting two or more similar support bodies to be interconnected with one another in a side-by-side relationship.

The support body may be formed of any suitable material and, preferably, is formed of a synthetic plastics material. With the front wall being formed of a transparent material, a mobile telephone held in a first holding formation clearly can be easily identified.

It must be appreciated that the accessory of the invention may include any number of pairs of holding formations, it being envisaged in this regard that the accessory of the invention will be particularly suitable for use in a domestic situation in which, within a family, there may exist a relatively large number of mobile telephones and in which the accessory of the invention can provide for all the mobile telephones to be neatly held together and to be charged in a neat and effective manner, while using only one mains power supply point.

The accessory of the invention also may be associated with any other means that can be associated with the use of a mobile telephone, particularly to provide for communication with mobile telephones held thereby.

Further features of the invention are described hereafter with reference to an example of an accessory for use with mobile telephones, in accordance with the invention, which is illustrated in the accompanying diagrammatic drawings. In the drawings.

Figure 1:
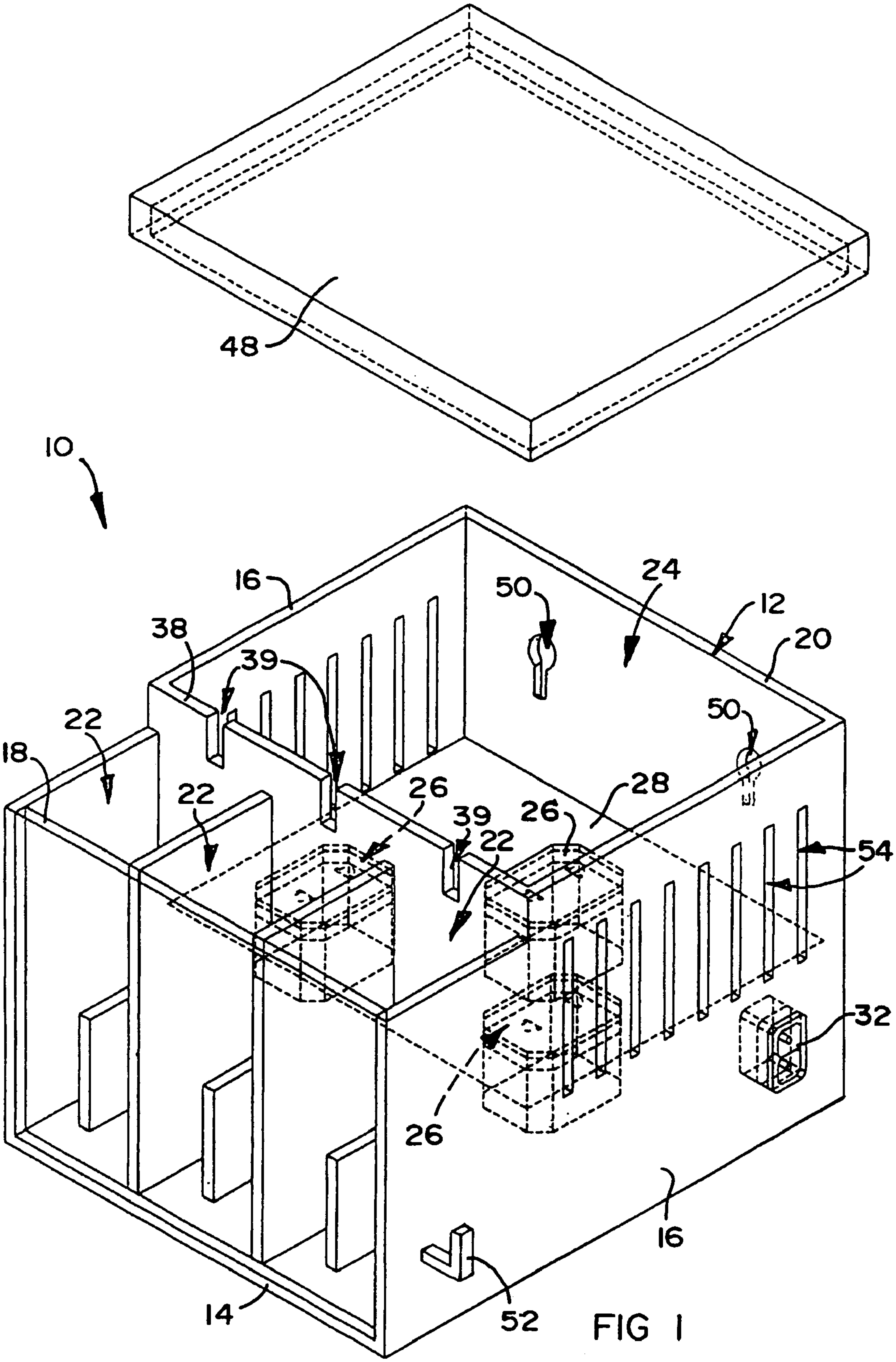
FIG. 1 shows a three-dimensional view of an accessory for use with mobile telephones, in accordance with the invention, with the lid thereof displaced from its operative position.

Referring to the drawings, an accessory for use with mobile telephones, in accordance with the invention, is designated generally by the reference numeral 10. The accessory 10 comprises a support body in the form of a box-like structure 12, the box-like structure 12 being defined by a base wall 14, two side walls 16, a front wall 18 and a rear wall 20.

The box-like structure 12 is divided into three pairs of holding formations, each pair of holding formations including a first compartment 22 within which a mobile telephone can be held and a second compartment 24 in which the charger of a mobile telephone can be held. In the particular embodiment of the invention as shown, the second compartment 24 of the three pairs of holding formations comprise a common compartment, although it must be appreciated that these compartments also can be separated by partition walls.

Figure 3:
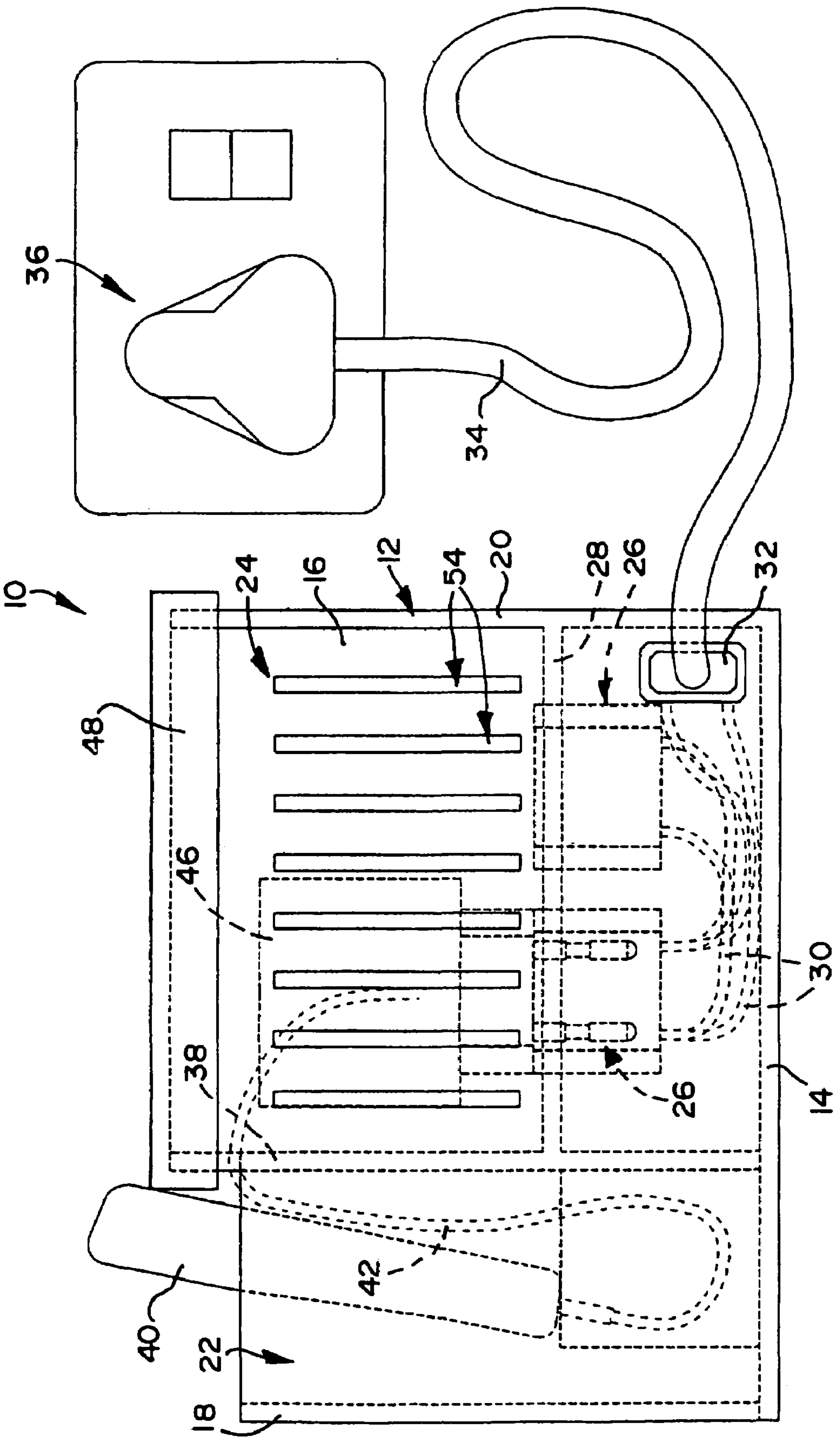
FIG. 3 shows a side view of the accessory of FIG. 1, in its operative configuration.

Each second compartment 24 forming a pair of holding formations with a first compartment 22 has a socket arrangement in the form of a two-pin socket formation 26 located therein, the sockets of the socket formations 26 being rendered accessible for two-pin plugs to be plugged therein via a raised floor 28 within the compartment 24, beneath which the remainder of the socket formations are located (see particularly FIGS. 1 and 3).

Figure 2:
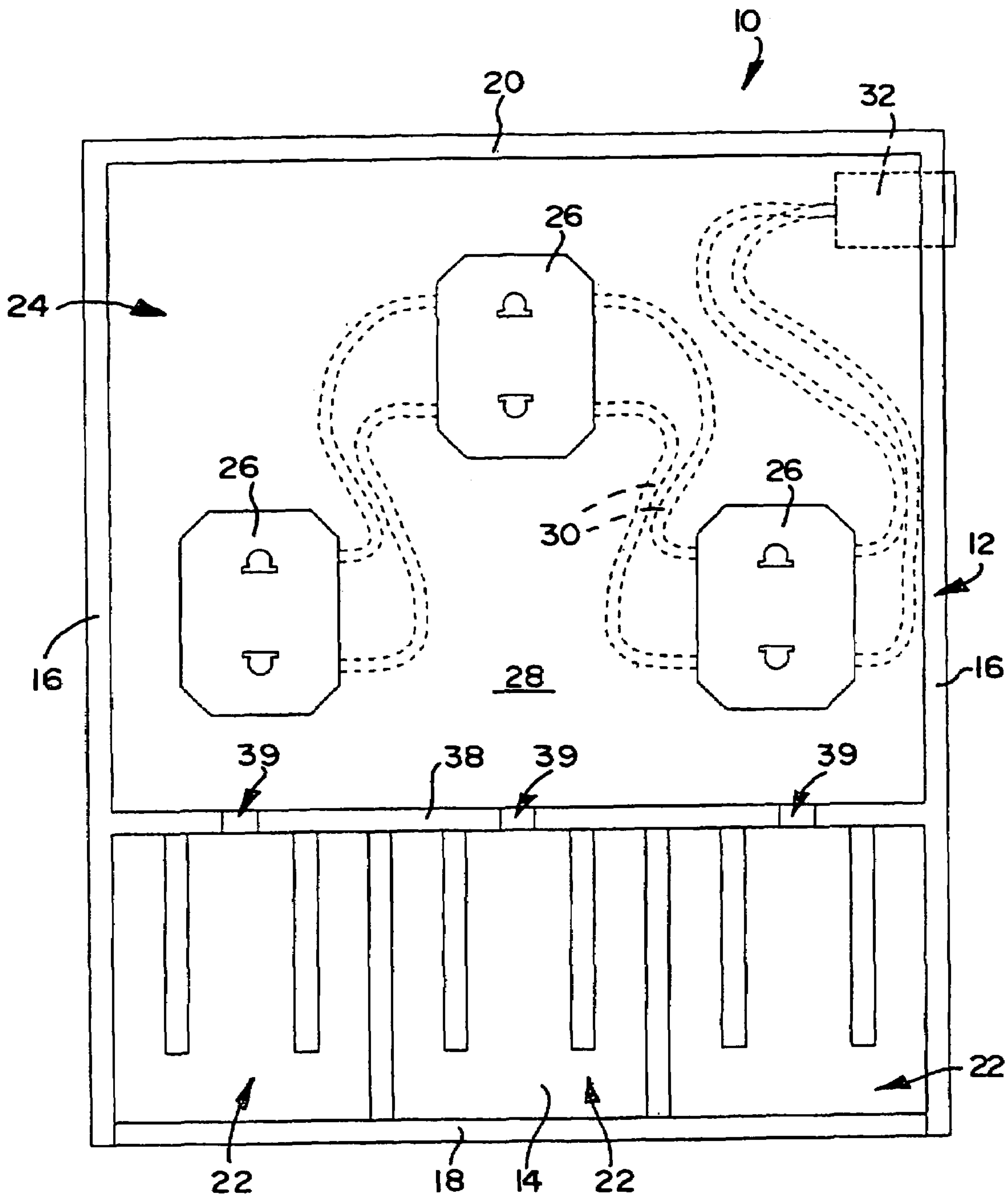
FIG. 2 shows a plan view of the accessory of FIG. 1, without its lid.

As is illustrated clearly in FIG. 2 of the drawings, the socket formations 26 are electrically connected with one another via conductor wires 30 and are electrically connected to a connector socket 32, permitting a power supply to the socket formations 26 from a mains power supply via a cord 34, in use connected between the mains power supply 36 and the connector socket 32 (see FIG. 3). The sockets of the socket formations 26 are formed particularly to permit either specific, or a range of different, connector pins of mobile telephone chargers to be plugged therein, the particular sockets as shown in FIG. 2 being adapted to receive a range of different connector pins, as are commonly associated with different countries, to be plugged therein. As such, three-pin socket formations also may be provided for, where required.

The wall 38 dividing the pairs of holding formations, each defined by a first compartment 22 and a second compartment 24, has three slot formations 39 formed therein, each slot formation 39 being formed to receive a connector wire leading from a mobile telephone charger plugged into a socket formation 26 to a first compartment 22, in order to permit plugging into a mobile telephone that can be held within the first compartment 22. FIG. 3 particularly illustrates the operative configuration of a mobile telephone with respect to its charger, with the mobile telephone 40 being held within a first compartment 22 and being connected via a connector wire 42 to its charger 46, that is plugged into a socket formation 26.

It will thus be understood that when connected to a mains power supply 36 in the configuration as shown in FIG. 3, charging of the mobile telephone 40 when so plugged in will occur. It will also be understood that the second compartments 24, being defined as a common compartment, can have three mobile telephone chargers plugged therein, each charger to be associated with a mobile telephone to be held within a first compartment 22. With mobile telephone chargers so positioned within the common compartment forming the compartments 24, a lid 48 of the accessory 10 can cover the common compartment, particularly as shown in FIG. 3.

For use, the accessory of the invention can be positioned on any suitable support surface in a suitably accessible location where it can be effectively plugged into a mains power supply, permitting the use only of this single power supply for charging three mobile telephones held in the respective first compartments 22 defined within the box-like structure 12, while the chargers of the mobile telephones are held within the common compartment forming the compartments 24. This permits the mobile telephones to be held in a neat configuration and in a location where they are easily accessible, while also not requiring each mobile telephone to be charged from a separate mains power supply. The rear wall 20 of the box-like structure 12 also has keyhole formations 50 formed therein, whereby the box-like structure can be mounted conveniently on a support wall, thereby still further facilitating the use of the accessory of the invention for the effective "storage" of mobile telephones.

It will be understood that the accessory of the invention will be particularly useful in domestic situations where a number of family members have their own mobile telephones that require simultaneous charging. It is envisaged in this regard that the front wall of the box-like structure 12 will be formed of a transparent material, rendering individual mobile telephones easily identifiable.

Also as illustrated, the side walls 16 of the box-like structure 12 have venting slots formed therein in order to deal with any heating that may occur within the compartments 24 while mobile telephones are charged via chargers located therein. It is envisaged also that the accessory of the invention and, particularly, the individual pairs of holding formations may be associated with hook-like formations located externally on the box-like structure (only one formation 52 shown in FIG. 1), permitting the owners of particular mobile telephones to hang, for example, their car keys from the accessory, thus facilitating the easy accessibility of keys and mobile telephones and avoiding mobile telephones being "forgotten".

As illustrated in FIGS. 1 and 3, the side walls 16 of the box-like structure 12 has venting slots 54 defined therein which can serve to prevent overheating with the common compartment forming the compartments 24, during charging of mobile telephones.

It must be appreciated that the accessory of the invention may be associated with any number of pairs of holding formations and it is envisaged also in this regard that where accessories are associated, for example, with two pairs of holding formations, the opposite side walls of the accessory may be associated with interconnecting formations whereby similar accessories can be held in an adjacent side-by-side relationship, thus forming a combination for holding different numbers of mobile telephones together, in a neat convenient configuration as herein envisaged.

What is claimed is:

1. An accessory for use with mobile telephones comprising a support body that defines at least two pairs of holding formations, each pair of holding formations including a first formation in which a mobile telephone can be removably held and a second formation in which a mobile telephone charger having pins can be removably held, and wherein the support body has an electrical connector arrangement located thereon that includes a socket arrangement for the second formation of each pair of holding formations for receiving the pins of the mobile telephone charger, and connector means for connecting the socket arrangements to a mains electricity power supply.

2. An accessory as claimed in claim 1, in which the support body comprises a box-like structure defined by a base wall, two side walls, a front wall and a rear wall and in which the pairs of holding formations are compartments defined within the box-like structure.

3. An accessory as claimed in claim 2, in which the pairs of holding formations are disposed adjacent one another between the side walls of the box-like structure, with each first formation being a compartment disposed adjacent the front wall of the structure and each second formation being a compartment disposed operatively behind the first formation with which it forms a pair.

4. An accessory as claimed in claim 3, in which the second formations of the pairs of holding formations comprise a common compartment in which the socket arrangements are positioned to each receive the pins of a mobile telephone charger therein in a configuration in which all the socket arrangements can have the pins of a mobile telephone charger received therein while located in the common compartment, operatively behind a first formation in which an associated mobile telephone can be held.

5. An accessory as claimed in claim 4, which includes a lid for the said common compartment.

6. An accessory as claimed in claim 2, in which the compartments defining the pairs of holding formations are each separated by a partition wall that has a slot formation defined therein for receiving an electric cord of a mobile telephone charger to permit a mobile telephone held in a first compartment to be electrically connected with its charger via a cord leading from the charger.

7. An accessory as claimed in claim 2, in which the front wall of the box-like structure is of a transparent sheet material.

8. An accessory as claimed in claim 1, in which the support body defines formations for supporting the body against a support wall.

9. An accessory as claimed in claim 1, in which the support body has at least one hook-like formation projecting therefrom in a configuration in which at least one key can be suspended from the support body.

10. An accessory as claimed in claim 1, in which each socket arrangement is adapted to cooperate with the connector pins of a predetermined mobile telephone charger.

11. An accessory as claimed in claim 1, in which each socket arrangement is adapted to cooperate with the connector pins of a predetermined range of mobile telephone chargers.

12. An accessory as claimed in claim 1, in which the connector means of the electrical connector arrangement includes a connector body mounted on the support body, which is electrically connected to the socket arrangements and which is accessible to permit a connector at one end of an electrical cord to cooperate therewith for connecting the socket arrangements in line with a main electricity power supply, to which the other end of the cord is connectable via a connector plug.

13. An accessory as claimed in claim 1, in which the connector arrangement includes an on-off switch for controlling current flow to the socket arrangements.

14. An accessory as claimed in claim 1, in which the support body defines complementary interconnecting formations on the respective opposite sides thereof for permitting two or more similar support bodies to be interconnected with one another in a side-by-side relationship.

15. An accessory for holding mobile phones comprising:

a) a box-like structure, b) pairs of holding formations formed in the box-like structure wherein each of the pairs of holding formations comprises a first compartment for holding the mobile phone and a second compartment, c) a socket arrangement positioned in the second compartment, a main power supply and a power supply cord in electrical communication with the main power supply and for supplying electrical power to the socket arrangement, d) a mobile telephone charger receivable in the second compartment and supplied with electrical from the socket arrangement and wherein the mobile telephone is in electrical communication with the mobile telephone charger and charged with electrical power supplied by the mobile telephone charger, and e) a raised floor in the second compartment and supported therein such that the raised floor is substantially flush with the socket arrangement.

16. A method of providing an accessory for use with mobile telephones comprising the steps of:

a) providing a support body and defining two or more pairs of holding formations, each pair of holding formations including a first formation in which a mobile telephone can be held and a second formation in which a mobile telephone charger can be held and providing the mobile telephone charger with pins, b) providing an electrical connector arrangement located in the support body and providing the electrical connector arrangement with a socket arrangement for receiving the pins of the mobile telephone charger and wherein the mobile telephone charger is located in the second formation of each pair of holding formations, and c) providing a connector means and providing a main electrical power supply and connecting the connector means with the main electrical power supply.

* * * * *